United States Patent [19]

Banker

[11] Patent Number: 4,466,017
[45] Date of Patent: Aug. 14, 1984

[54] SYNC SUPPRESSION SCRAMBLING OF TELEVISION SIGNALS FOR SUBSCRIPTION TV

[75] Inventor: Robert O. Banker, Cumming, Ga.

[73] Assignee: Scientific-Atlanta, Inc., Atlanta, Ga.

[21] Appl. No.: 334,040

[22] Filed: Dec. 23, 1981

[51] Int. Cl.³ .................. H04N 7/16; H04K 1/04
[52] U.S. Cl. .................. 358/120; 358/117; 358/121
[58] Field of Search ............ 358/120, 121, 117

[56] References Cited

U.S. PATENT DOCUMENTS

| | | | |
|---|---|---|---|
| 2,705,740 | 4/1955 | Druz | 358/120 |
| 2,907,816 | 10/1959 | Weiss | 358/120 |
| 3,081,376 | 3/1963 | Loughlin et al. | 358/120 |
| 3,116,363 | 12/1963 | Doundoulakis | 358/120 |
| 3,184,537 | 5/1965 | Court et al. | 358/120 |
| 3,201,511 | 8/1965 | Doundoulakis | 358/120 |
| 3,242,258 | 3/1966 | Salit et al. | 358/120 |
| 3,439,113 | 4/1969 | Walker | 358/120 |
| 3,460,161 | 8/1969 | Waller et al. | 358/120 |
| 3,478,166 | 11/1969 | Reiter et al. | 358/120 |
| 3,530,232 | 9/1970 | Reiter et al. | 358/120 |
| 3,729,576 | 4/1973 | Court | 358/120 |
| 3,736,369 | 5/1973 | Vogelman et al. | 358/118 |
| 3,813,482 | 5/1974 | Blonder | 358/118 |
| 4,024,575 | 5/1977 | Harney et al. | 358/118 |
| 4,064,536 | 12/1977 | Saeki et al. | 358/118 |
| 4,095,258 | 6/1978 | Sperber | 358/120 |
| 4,145,716 | 3/1979 | Uemura et al. | 358/118 |
| 4,145,717 | 3/1979 | Guif et al. | 358/121 |
| 4,163,252 | 7/1979 | Mistry et al. | 358/118 |
| 4,333,107 | 6/1982 | McGuire et al. | 358/120 |

OTHER PUBLICATIONS

Product Sheets (2) Jerrold "Starpack".
D & C Engineers CDK 234–236 pages from Manual.

Primary Examiner—S. C. Buczinski
Attorney, Agent, or Firm—Martin LuKacher

[57] ABSTRACT

In order to provide higher efficiency of security in sync suppression scrambling of subscription TV signals, the signals are encoded with a timing pulse having a selected time delay relationship with the suppressed horizontal sync intervals of the TV signals. The timing can be implemented digitally by selecting a plurality (e.g., 12) of different timings. The timing can also be dynamically varied. The TV signals are descrambled by restoring the sync pulses at only those receiving stations authorized to receive the premium subscription programming which have circuits for generating restoring pulses with the selected time relationship upon reception of the timing signals. Accordingly, the use of unauthorized descramblers, which are insensitive to the timing signals or do not provide the restoring pulses in proper time relationship, is discouraged.

40 Claims, 11 Drawing Figures

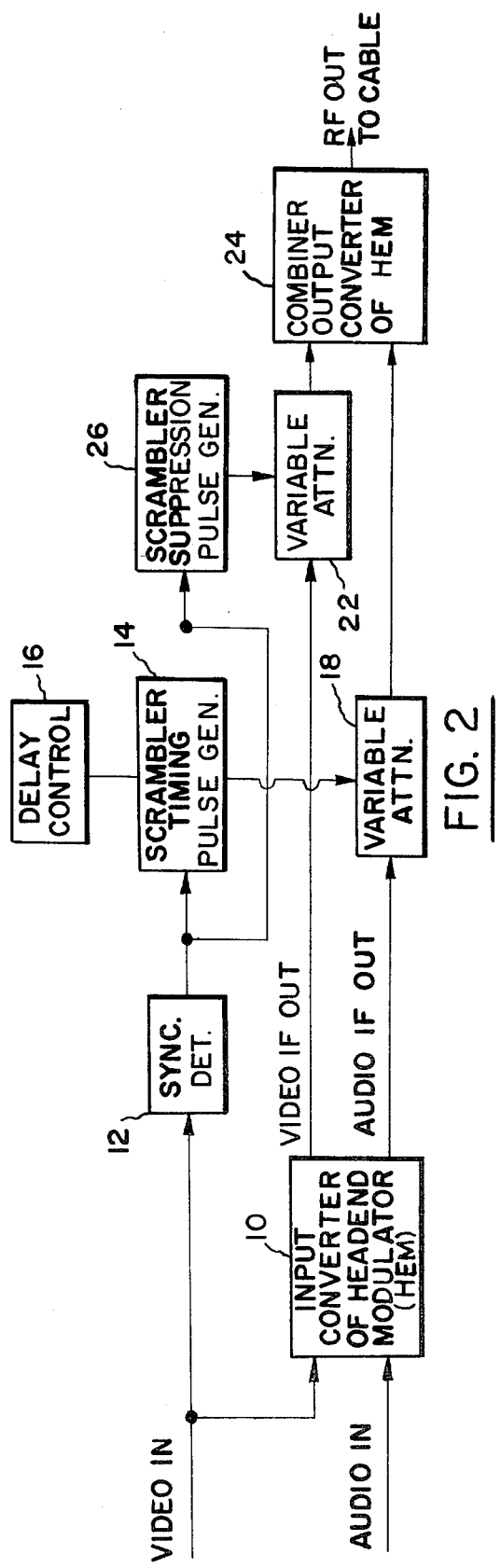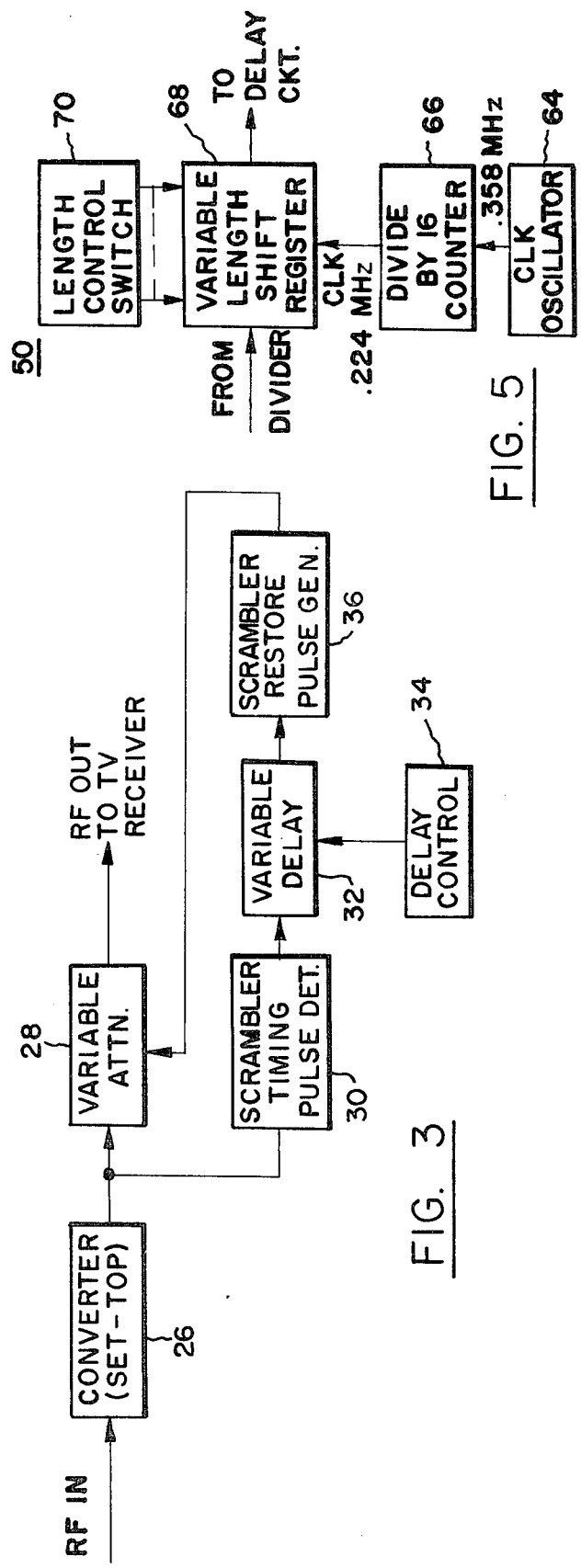

SYNC SUPPRESSION SCRAMBLING OF TELEVISION SIGNALS FOR SUBSCRIPTION TV

DESCRIPTION

The present invention relates to subscription TV in which TV signals are scrambled by suppressing the sync intervals thereof so that the TV signals are distorted when displayed except at authorized receiving stations which are equipped to descramble the TV signals.

The invention is especially suitable for use in the transmission of premium, subscription TV programs by cable systems. Features of the invention may also be applied to the transmission and reception of premium TV by broadcast or in other networks such as in hotels, dormitories and other places of public accommodation.

Sync suppression scrambling and descrambling systems of various types have been suggested, and some systems are presently in use on those channels of cable TV systems which offer premium subscription programming. These systems generally operate by the transmission of the TV signals with the horizontal sync intervals thereof suppressed. At the authorized receiving stations, the sync signals are restored by the use of a restoring signal, which may be transmitted as a pilot tone on an unused cable channel or which is generated in response to the horizontal sync components of the transmitted signal or by other means. Various systems for sync suppression scrambling are described in the following patents. In most cases the suppression signals are pulses. Sine wave suppression signals have been suggested in the five patents which are listed last below. Druz, U.S. Pat. No. 2,705,740, issued Apr. 5, 1955; Weiss, U.S. Pat. No. 2,907,816, issued Oct. 6, 1959; Loughlin et al, U.S. Pat. No. 3,081,376, issued Mar. 12, 1963; Doundoulakis, U.S. Pat. No. 3,116,363, issued Dec. 31, 1963; Court et al, U.S. Pat. No. 3,184,537, issued May 18, 1965; Doundoulakis, U.S. Pat. No. 3,201,511, issued Aug. 17, 1965; Salit et al, U.S. Pat. No. 3,242,258, issued Mar. 22, 1966; Walker, U.S. Pat. No. 3,439,113, issued Apr. 15, 1969; Rieiter et al, U.S. Pat. No. 3,478,166, issued Nov. 11, 1969; Reiter et al, U.S. Pat. No. 3,530,232, issued Sept. 22, 1970; Vogelman et al, U.S. Pat. No. 3,736,369, issued May 29, 1973; Blonder, U.S. Pat. No. 3,813,482, issued May 28, 1974; Sperber, U.S. Pat. No. 4,095,258, June 13, 1978; Mistry et al, U.S. Pat. No. 4,163,252, issued July 31, 1971, Court, U.S. Pat. No. 3,729,576, issued Apr. 24, 1973; Harney et al, U.S. Pat. No. 4,024,575, issued May 17, 1977; Saeki et al, U.S. Pat. No. 4,064,536, issued Dec. 29, 1977; Uemora et al, U.S. Pat. No. 4,145,716, issued Mar. 20, 1979; and Guif et al, U.S. Pat. No. 4,145,717, issued Mar. 20, 1979. All of the above listed patents are United States patents.

The problem with sync suppression scrambling schemes which have been suggested, except for those which transmit complex coding signals and which have not been generally accepted, is the ease with which the signals can be descrambled and restored to normal amplitude so that they can be displayed at unauthorized receiving stations. For example in the case where the signals are encoded by a pilot tone or timed to the horizontal sync signals, all that is required is a simple circuit for detecting these pilot or sync rate signals and generating a restoring pulse for a gated attenuator through which the television signal passes in order to restore the television signal to normal amplitude. One such scrambler has been offered by a company known as C&D Engineers, their model CDK 234 and 236 descrambler.

It is a feature of this invention to provide improved methods of and systems for the transmission of premium subscription TV programs with greater scrambling efficiencies and which is more difficult to defeat and descramble without authorization, but without increasing the complexity and cost of sync suppression scrambling so as to make the use thereof impractical.

It is a further feature of the invention to provide improved methods of and systems for the transmission of encoded suppressed sync TV signals, as well as for the reception and descrambling of such signals, which can be implemented by digital circuits which further facilitates the fabrication and use of sync suppression scrambling having high security efficiency at low cost.

It is a further feature of the present invention to provide improved methods and systems for sync suppression scrambling and descrambling of TV signals which may be encoded with selectively coded timing which may be dynamically varied, so that the generation of sync restoring signals with the proper timing to descramble and normalize the TV signal is available only to authorized parties thereby making it very difficult to defeat the security of the system and discouraging the use of unauthorized descramblers.

Briefly described, sync suppression scrambling and descrambling of TV signals for subscription TV programs, in accordance with the invention, may be carried on by generating sync suppression pulses in overlapping time relationship with the horizontal sync pulses of the TV signal. Timing pulses are generated in selected time relationship with the sync suppression pulses such that each of the timing pulses and the sync suppression pulses have a selected time delay With respect to each other. This time delay may be selected, preferably digitally, from a plurality of different delays or dynamically varied. The horizontal sync pulses are suppressed to below normal amplitude, which sync detectors of conventional TV receivers at the receiving stations are capable of using. The timing pulses are transmitted with the TV signals, preferably by modulating the FM audio carrier thereof to encode the TV signals. The scrambled and encoded TV signals are transmitted from the transmitting stations which may, for example, be the head end system of a cable TV system to the receiving stations, for example on a channel dedicated to premium programming. The timing pulses are derived at these receiving stations with the selected delay to provide delayed timing pulses. Then restoring pulses are generated in proper overlapping time relationship with the horizontal sync pulses upon occurrence of the delayed timing pulses. The TV signals are restorable to normal amplitude through the use of the restoring pulses to descramble the TV signals. Digital delays are preferably interposed on the timing pulses to provide the delayed timing pulses. The selected delays may be pre-set, for example as pre-set digital delays at the transmitting point and also at those receiving stations which are authorized to receive premium programming. If desired and when the delays are to be dynamically varied, delay control signals are transmitted with the TV signals to vary the delay dynamically at the authorized receiving stations so as to correspond to the variation in delay at the transmitting point. Only at authorized receiving stations will the restoring pulses be in synchronism with the horizontal sync intervals of the TV signals, thereby enabling them to be restored to normal amplitude and to be displayed in a visually satisfactory manner on TV receivers at the authorized stations.

The foregoing and other objects features and advantages of the invention, as well as presently preferred embodiments thereof and the best modes now known for practicing the invention, will become more apparent from a reading of the following description in connection with the accompanying drawing in which:

FIG. 2 is a block diagram illustrating, in a general manner, a system for sync suppression scrambling in accordance with the invention;

FIG. 3 is a block diagram illustrating, in a general manner, a system for sync suppression descrambling in accordance with the invention;

FIG. 5 is a block diagram of a digital circuit for providing variable delay between the timing and suppression pulses generated in the system shown in FIG. 4;

Figure 7:
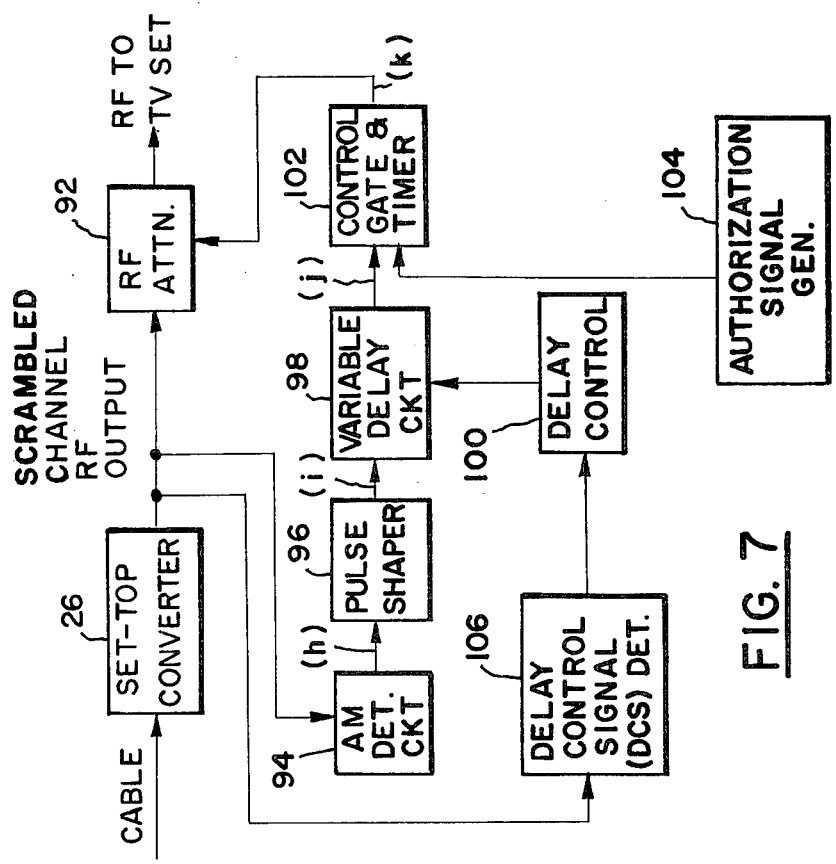
FIG. 7 is a block diagram showing a descrambling system which may be used with the scrambler shown in FIG. 4.
Figure 9:
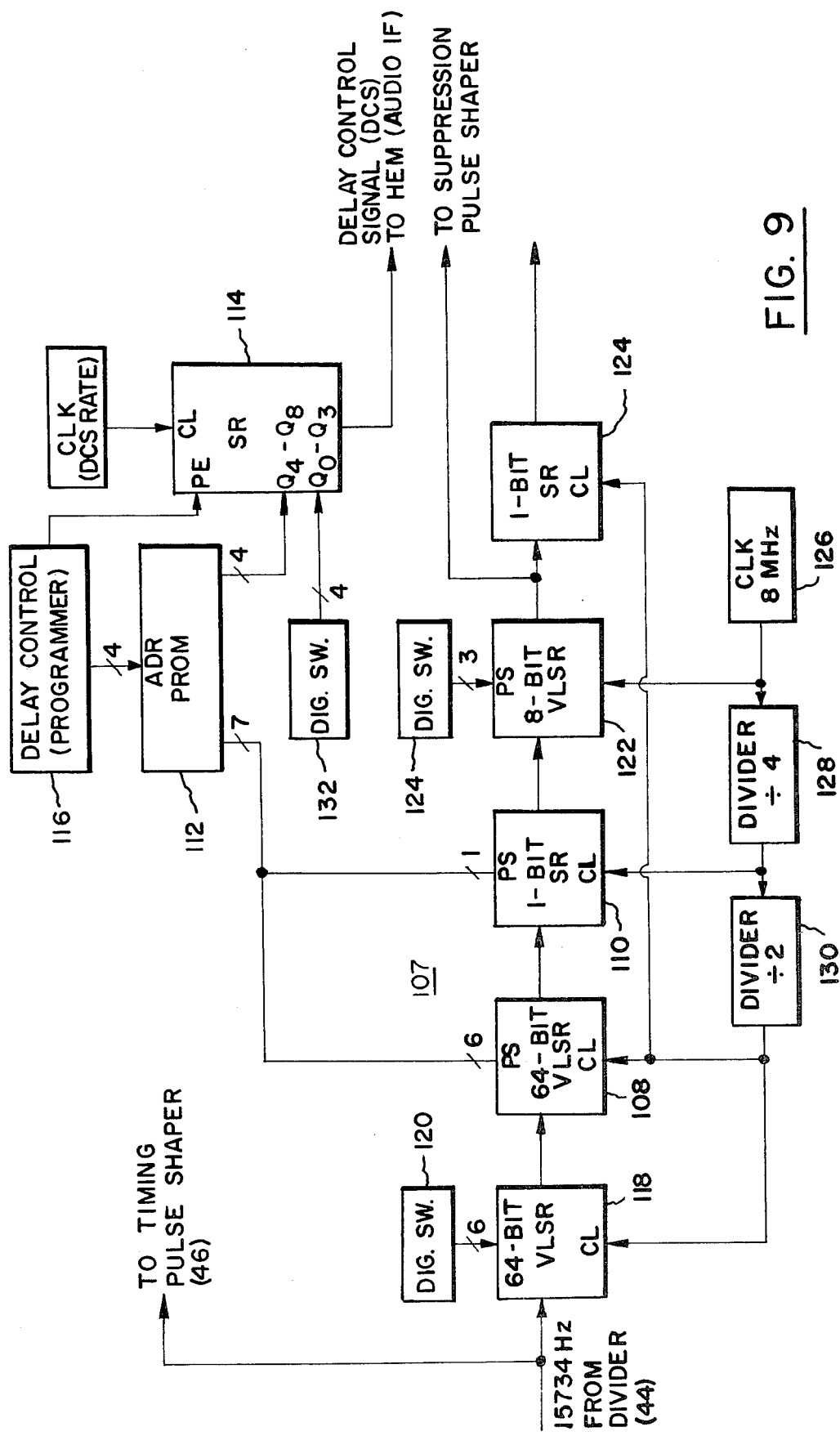
FIG. 9 is a block diagram illustrating a digital system for providing selected delays which may be dynamically variable and which may be used in the system shown in FIG. 4.
Figure 10:
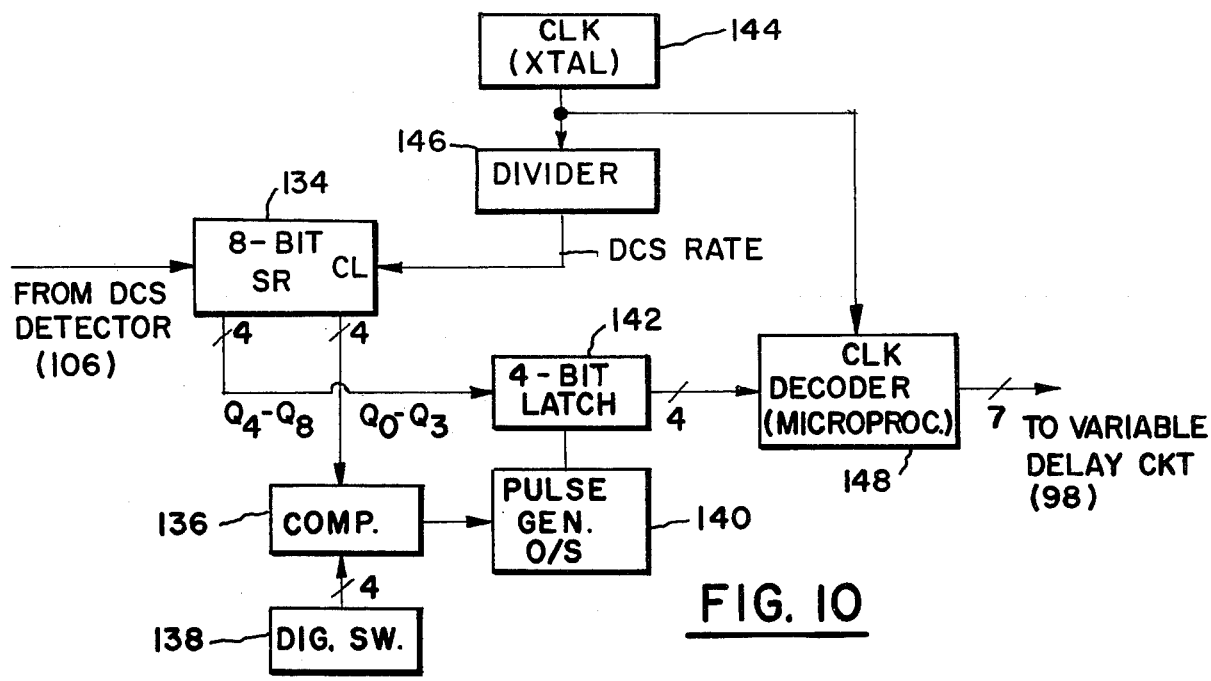
Figure 11:
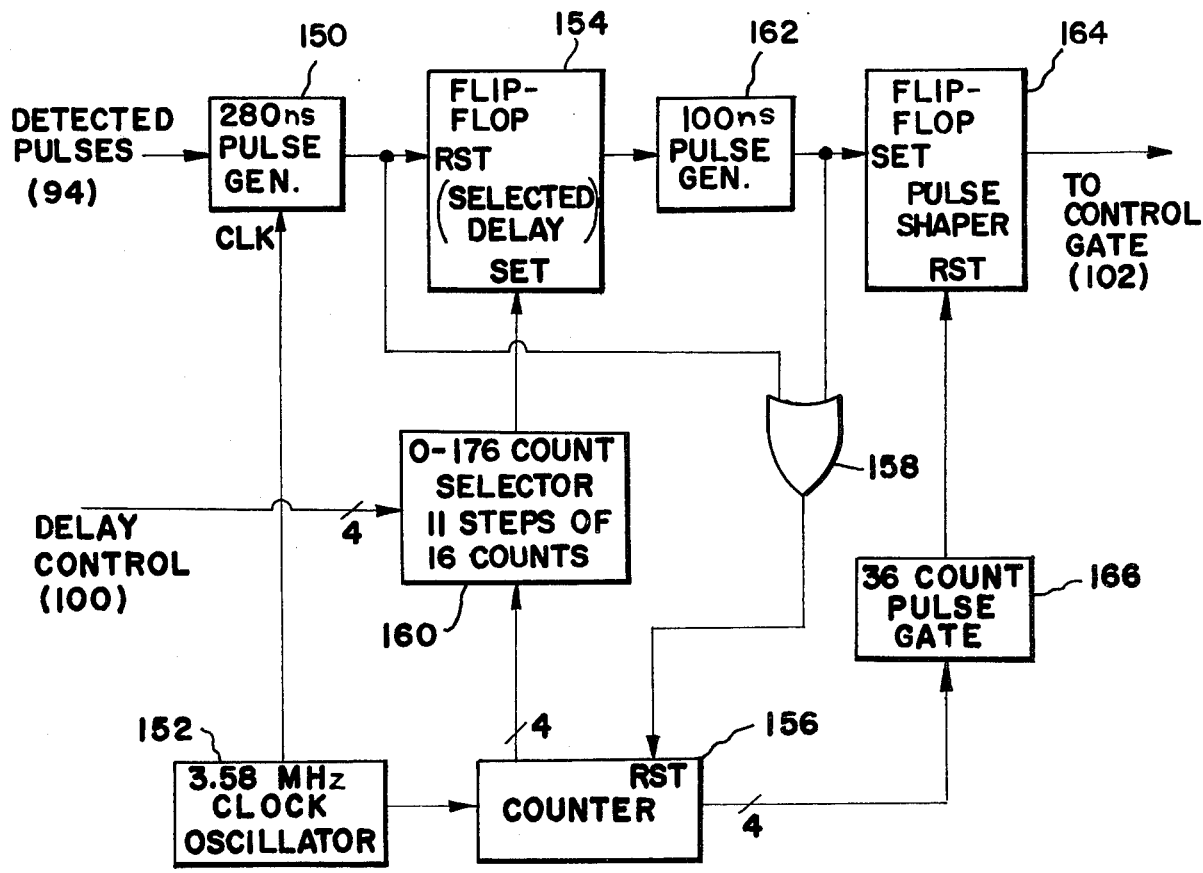

FIG. 10 is a block diagram illustrating a digital system, particularly useful when the selected delay between the scrambling and timing pulses is dynamically varied, for example, by the use of the digital system shown in FIG. 9, for deriving the delayed timing pulses which may be used for the generation of restoring pulses in the system shown in FIG. 7; and FIG. 11 is a block diagram of a digital system for providing selected delays which may be used for the generation of restoring pulses in the system of FIG. 7.

Figure 1:
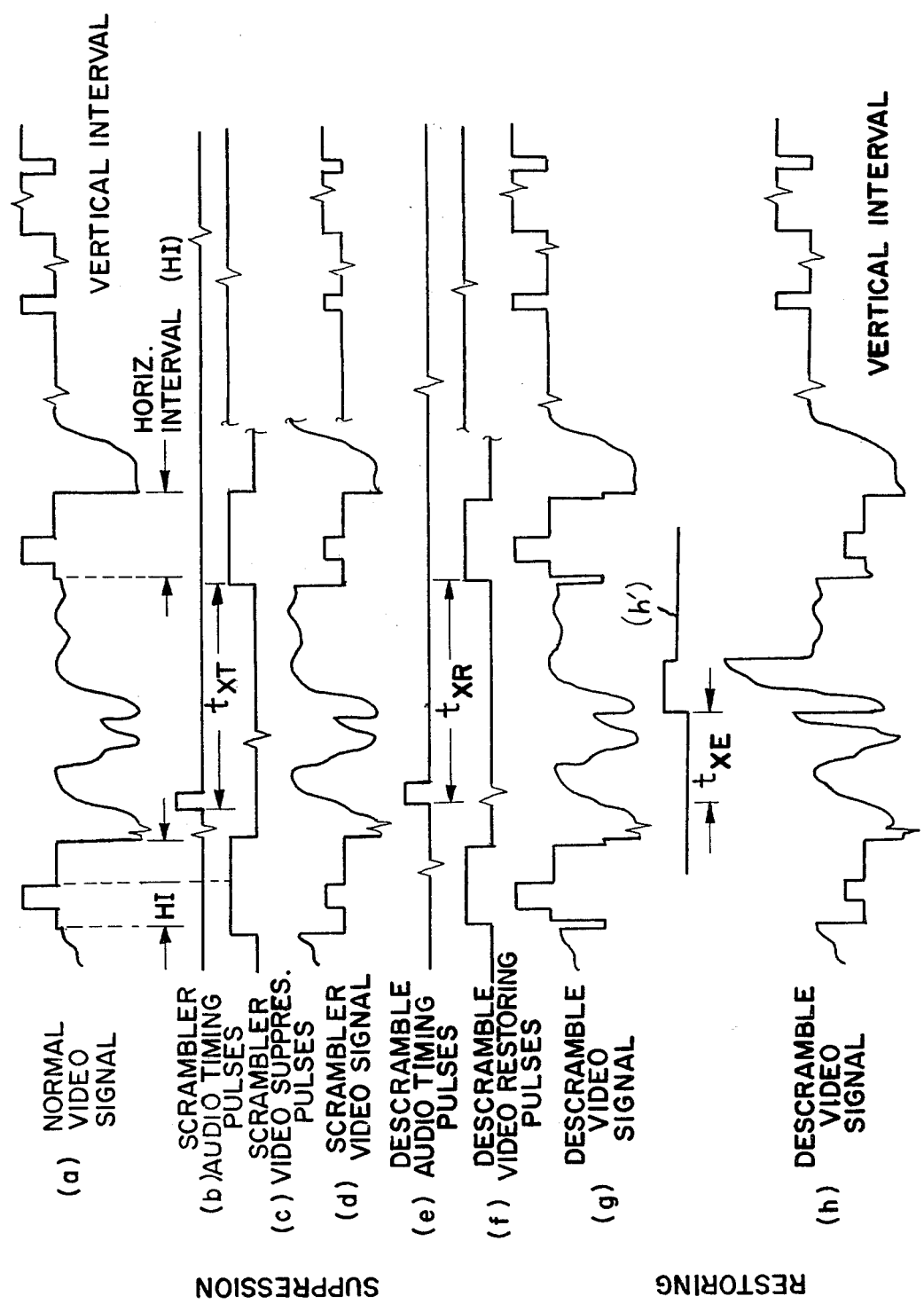
FIG. 1 shows a series of wave forms illustrating sync suppression scrambling and descrambling in accordance with the invention.

Referring to the drawings and more particularly to FIG. 1, there is shown in wave form (a) the normal video signal of a TV signal with horizontal and vertical sync intervals. Horizontal sync pulses are located in the horizontal sync intervals with the color burst following the picture information. The audio signal is part of the TV signal and may be FM audio signal as is conventional. The vertical interval includes horizontal as well as the vertical sync pulses. The horizontal pulses are repetitive at the horizontal sync rate of 15,534 Hz while the vertical sync intervals occur each frame of the picture, as is conventional.

A timing pulse identified as the scrambler audio timing pulse in FIG. 1(b) is generated at the horizontal sync rate. This pulse amplitude modulates the FM audio signal to encode the TV signal with information as to the timing of the scrambler sync suppression pulse. The suppression pulse is shown in wave form (c) of FIG. 1 as the scrambler video suppression pulse. This pulse is also repetitive at the horizontal sync rate and has a selected time relationship, indicated in FIG. 1 as $t_{XT}$ with respect to the timing pulse. In effect, the scrambling pulse may be considered to be the timing pulse delayed by the selected time delay $t_{XT}$ and reshaped as shown in FIG. 1(c). The timing is such that the suppression pulses are in overlapping relationship with the horizontal sync pulses and coincident with the horizontal interval. The time delay $t_{XT}$ may be selected from a plurality of delays, which in accordance with an embodiment of the invention, may be 12 delays each of different duration. The delay $t_{XT}$ can also be a dynamically varying delay (a delay which varies in time, preferably continually such that in successive intervals of time the delay $t_{XT}$ is a different duration, for example one of the twelve different durations which may be selected).

The vertical interval is also shown in FIG. 1(c) as a vertical suppression pulse, indicated as a level equal to the level of the suppression pulses during the horizontal intervals. The use of the vertical suppression pulses is optional, but is preferred in that it increases the distortion of the picture represented by the scrambled video signal at unauthorized receivers. It will be noted that audio timing pulse ceases and the video signal is attenuated during the vertical interval. The video signal is preferably converted to IF frequency when the suppression pulses are applied to attenuate the video signal to provide a scrambled video signal as shown in wave form (d) in FIG. 1. The FM audio is also preferably at IF frequency when it is modulated by the timing pulses to encode them onto the FM audio carrier. The scrambled video signal may be converted to the desired RF channel and transmitted to the receiving stations. Transmission may be on a cable of a cable TV system in a channel dedicated to premium subscription TV programs. When the scrambled signal is displayed on a conventional television receiver the picture will shift in a visually disturbing manner and will lack sufficient information or entertainment value.

Wave form (e) of FIG. 1 shows the demodulated timing pulse indicated as the descrambler audio timing pulse, which is derived by demodulating the FM audio signal at the receiving stations. The equipment for demodulation and descrambling may be part of a set-top converter which is provided to subscribers who pay for the premium programming. The descrambler detects the timing of the pulse shown in wave form (e) of FIG. 1 and delays the pulse by the selected delay, indicated as $t_{XR}$. The timing pulses are used to generate restoring pulses, indicated as being the descrambler video restoring pulses in wave form (f) of FIG. 1. These restoring pulses are coincident with the horizontal sync pulses and a portion of the horizontal sync interval which is of slightly shorter duration than that interval so as to assure restoration of the horizontal sync pulses without affecting the picture components of the signal. The restoring pulses appear as a restoring level during the vertical interval. The level of the pulses is shown as being inverse to the level of the scramble video signal so as to illustrate that the restoring pulses may be used to restore the horizontal and vertical sync pulses to their original or normal amplitude. In practice an attenuator operated by the restoring pulses which enables the horizontal and vertical sync signals to be increased in relative amplitude with respect to the other components of the video signal may be used.

The descrambled video signal with correct timing is shown in wave form (g) of FIG. 1. Devices which duplicate the inverse video restoring pulses that fail to duplicate the selected timing, $t_{XR}$, will for example, produce a signal similar to that shown in wave form (h) of FIG. 1. Fragmentary wave form (h) shows the erroneous restoring pulse, with the wrong timing, $t_{XE}$. Such a signal (like wave form (h)) will cause the normal sync pulses to appear as gray vertical bars on the television receiver. The picture information is split on both sides of these bars. There is no color burst lock. Such a poor quality picture contains little of entertainment or informational value. The higher security efficiency provided by the system should discourage the use of unauthorized descramblers, since they will provide only a distorted picture as mentioned above.

The scrambler system shown in FIG. 2 provides for high efficiency of scrambling of video signals in the manner illustrated in FIG. 1. The baseband video input of the premium programming is converted at the head end of the cable system by an input converter to IF frequency. The accompanying IF audio signal is similarly converted. This conversion is carried out by the input converter of the head end modulator (HEM) 10. A sync detector 12 detects the horizontal sync and may also detect the vertical sync pulses. A scrambler timing pulse generator 14, operated by a delay control 16, generates the timing pulses with the selected delay, which may be one of a plurality of different durations or dynamically varying, either continually or continuously as determined by the delay control 16. The timing pulses are applied to a variable attenuator 18 which effectively amplitude modulates the FM carrier of the FM audio signal, as by attenuating it except during the timing pulse.

A scrambler suppression pulse generator 20 generates the suppression pulses coincidentally with the horizontal sync intervals. Since both the suppression and timing pulses derive their timing from the sync pulses in the video signal, the selected time relationship between the timing and suppression pulses is maintained during each line of the television signal. The timing and suppression pulses are preferably generated by timing the suppression pulse generation from the timing pulses (as will be described in greater detail in connection with FIG. 4). The scrambler suppression pulse generator 20 generates the suppression pulse with sufficient delay to make up the difference in delay in the video and audio IF channels. Another variable attenuator 22 in the video IF channel suppresses the horizontal, and if desired the vertical sync signals, during their respective intervals of the video signal, and outputs a scrambled video IF signal to the output combiner and output converter 24 of the head end modulator (HEM). The converter locates the FM audio signal adjacent to the video signal in the RF channel allocated to the premium programming. This RF signal may be applied to the cable at the head end of the cable TV system. Accordingly the TV signal is scrambled and then encoded with the timing pulse on the FM audio.

Each receiving station which is adapted to receive subscription TV is provided with a system which is shown in general in FIG. 3. The RF input from the cable goes to the set-top converter 26 which may convert the cable channels to the standard channel frequencies and bands of the TV receiver which is to display a subscription TV program at the receiving station. The TV signal with audio and video combined is, when the premium channel is selected, connected through a variable attenuator 28 to the input terminal (the antenna terminals) of the TV receiver. The variable attenuator and the other circuits for descrambling may be contained in the set-top converter. The scrambler timing pulse is detected from the FM audio component of the TV signal by a timing pulse detector 30. This detector may include the usual traps and filters for the audio component of the TV signal and a diode AM detector. The timing pulse is subject to the selected delay in a variable delay circuit 32. The delay is selected by a delay control 34. The variable delay and delay control circuits 32 and 34 may be similar to the circuits which provide the selected delay in the scrambler timing pulse generator 14 (see FIG. 2). The delayed timing pulse is used to time the generation of each restoring pulse in a restore pulse generator 36. The restoring pulses are coincident with the horizontal sync pulses and most of the horizontal sync intervals of the video signals.

This restore pulse circuit may include a timing circuit responsive to the horizontal sync pulses in the TV signal to produce restoring pulses during the vertical sync interval as well as during the horizontal sync intervals. This circuitry is optional and is not used when vertical sync interval suppression pulses are not generated in the scrambler. It will be noted that the timing pulses are not transmitted during the vertical sync intervals of the scrambled signal. Accordingly receiving stations which are not equipped with the descrambler (for example, a separate board which may be installed in the set-top converter 26 at those receiving stations which subscribe for premium programming), the vertical sync pulses remain suppressed. Those receiving stations which are not equipped to detect timing pulses will, of course, not descramble the premium TV signals. Even those stations which are equipped to detect timing pulses will not descramble the signals because there will be no knowledge of the selected delays.

The selected delay may be one of 12 different durations which may be changed from time to time by visits of service personnel. The delay may be dynamically variable, as will be more fully explained below, in which case a delay control signal from the delay control 16 of the scrambler system (see FIG. 2) is combined with the TV signal in the combiner and output converter 24 and transmitted to the receiving stations. These signals will then operate the delay control so that the selected delay can be varied either continuously or continually from time to time. Only when the scrambler restore pulse is coincident with the horizontal sync pulses, and is operative to restore the TV signals with their horizontal and vertical components in normal amplitude relationship, is the TV receiver capable of extracting the sync signals and properly displaying the pictures represented by these signals on the screen of the TV receiver. Such display will be carried out only at those receiving stations which are authorized to receive premium programming, since the descrambling circuitry will not operate properly to descramble the TV signal except at such authorized stations.

Figure 4:
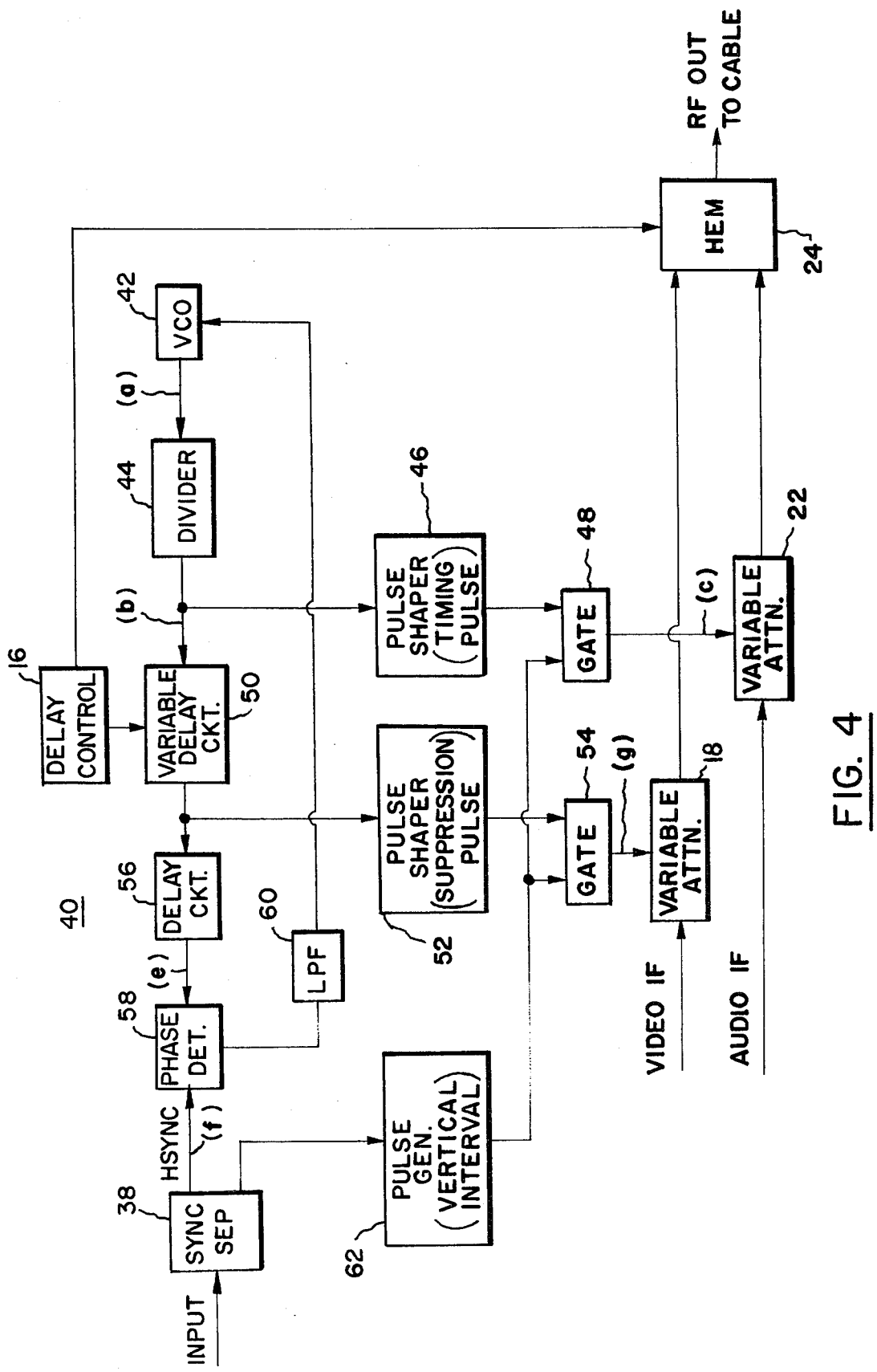
FIG. 4 is a block diagram illustrating a sync suppression scrambling system in accordance with an embodiment of the invention.

Referring to FIG. 4, the scrambler is shown in greater detail and in accordance with a presently preferred embodiment thereof. The composite TV signal, the video signal thereof or, and more preferably, the composite sync signal which has been stripped from the video, is applied to the input terminal of a sync separator circuit 38, which provides the horizontal sync signal (shown in wave form (f) of FIG. 8) and the vertical sync signal. The horizontal sync signal is used as a reference to locate the sync suppression pulses, shown in wave form (g) of FIG. 8 (labelled video attenuator suppression pulses) in overlapping, coincident time relationship with the horizontal sync pulses, as was discussed in connection with the scrambler suppression pulse generator 20 shown in FIG. 2.

A phase locked loop 40 provides the means for locating the suppression pulses in the necessary overlapping, coincident relationship with the horizontal sync pulses in the horizontal sync intervals. This loop also contains circuits for generating the timing pulses which are shown in wave form (d) of FIG. 8 (labelled audio attenuator timing pulses), and for generating the suppression pulses with the selected time relationship. The phase locked loop 40 includes a voltage controlled oscillator of relatively high frequency as compared to the horizontal sync rate (8.06 MHz, which is 512 times the horizontal sync pulse rate, being suitable). This oscillator is indicated as being a voltage controlled oscillator 42. The high frequency output from the oscillator is indicated in wave form (a) of FIG. 8. The oscillator output is shaped in the form of a pulse train. A divider 44 divides the oscillator output into a 50% duty cycle rectangular wave at the horizontal sync pulse rate (15,734 Hz). The divider output is shown in wave form (b) of FIG. 8. The leading edge of the divider output is used to generate the timing pulses. A timing pulse shaper 46, which may be a one shot, provides timing pulses of suitable duration, for example approximately 6 microseconds, through a gate circuit 48 to the variable attenuator 22 in the audio IF channel.

The divider output is applied to a variable delay circuit 50 to produce the selected delay between the suppression and timing pulses. This variable delay circuit is preferably a digital delay circuit of the type which will be described in greater detail in connection with FIGS. 5 and 7. The variable delay, $t_{XT}$ is illustrated in wave form (d) of FIG. 8 which shows the output of the variable delay circuit 50. The divider pulse train is delayed by the selected delay so that the selected timing for the suppression pulses with respect to the timing pulses is obtained. The selected delay may be selected from a plurality of different delay increments or continuously variable, in which case the delay control 16 outputs a delay control signal (DCS) to the combiner and output converter 24 of the head end modulator (HEM). The variable delay circuit 50 may be designed to insert a predetermined delay, to which the selected delay is added. Conceptually, this predetermined delay may be considered part of the total phase locked loop predetermined delay or set-up delay to compensate for different delays in the video IF and audio IF channels of the system.

The leading edges of the output pulses from the variable delay circuit 50 time and operate a pulse shaper 52. The duration of the output pulses from the pulse shaper 52 is preferably greater than the horizontal sync interval (for example, approximately 13 microseconds) so that the suppression pulse overlaps the horizontal sync pulses as shown in wave forms (f) and (g) of FIG. 8. The suppression pulses are applied through a gate 54 to the variable attenuator 18 in the video IF channel.

Figure 6:
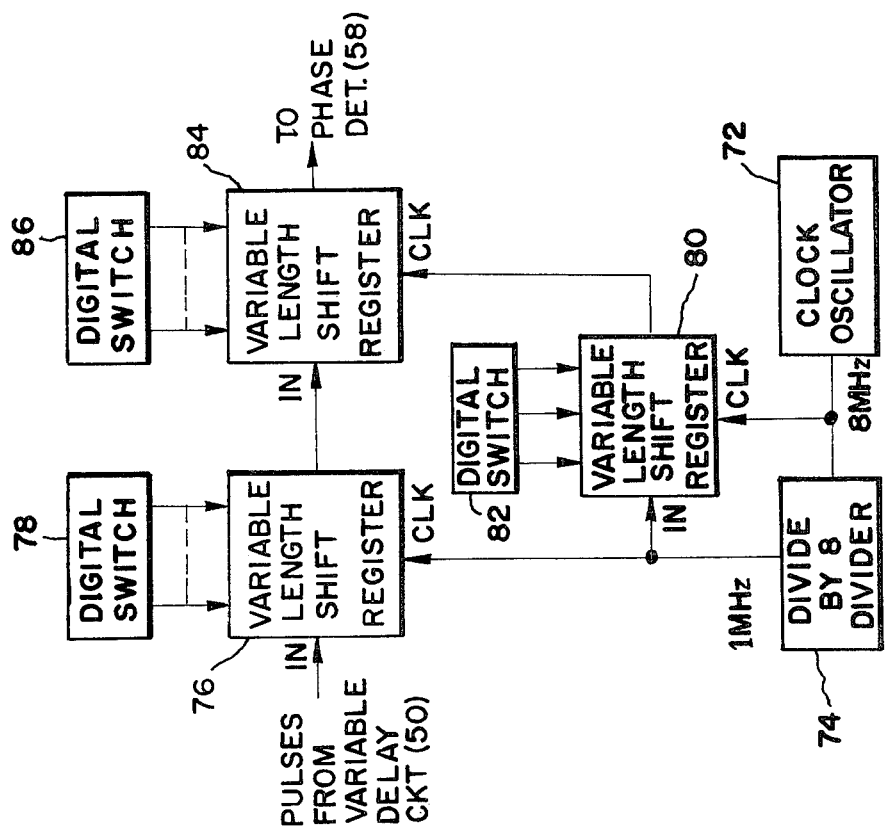
FIG. 6 is a block diagram illustrating another digital delay circuit which may be used in the system shown in FIG. 4.
Figure 8:
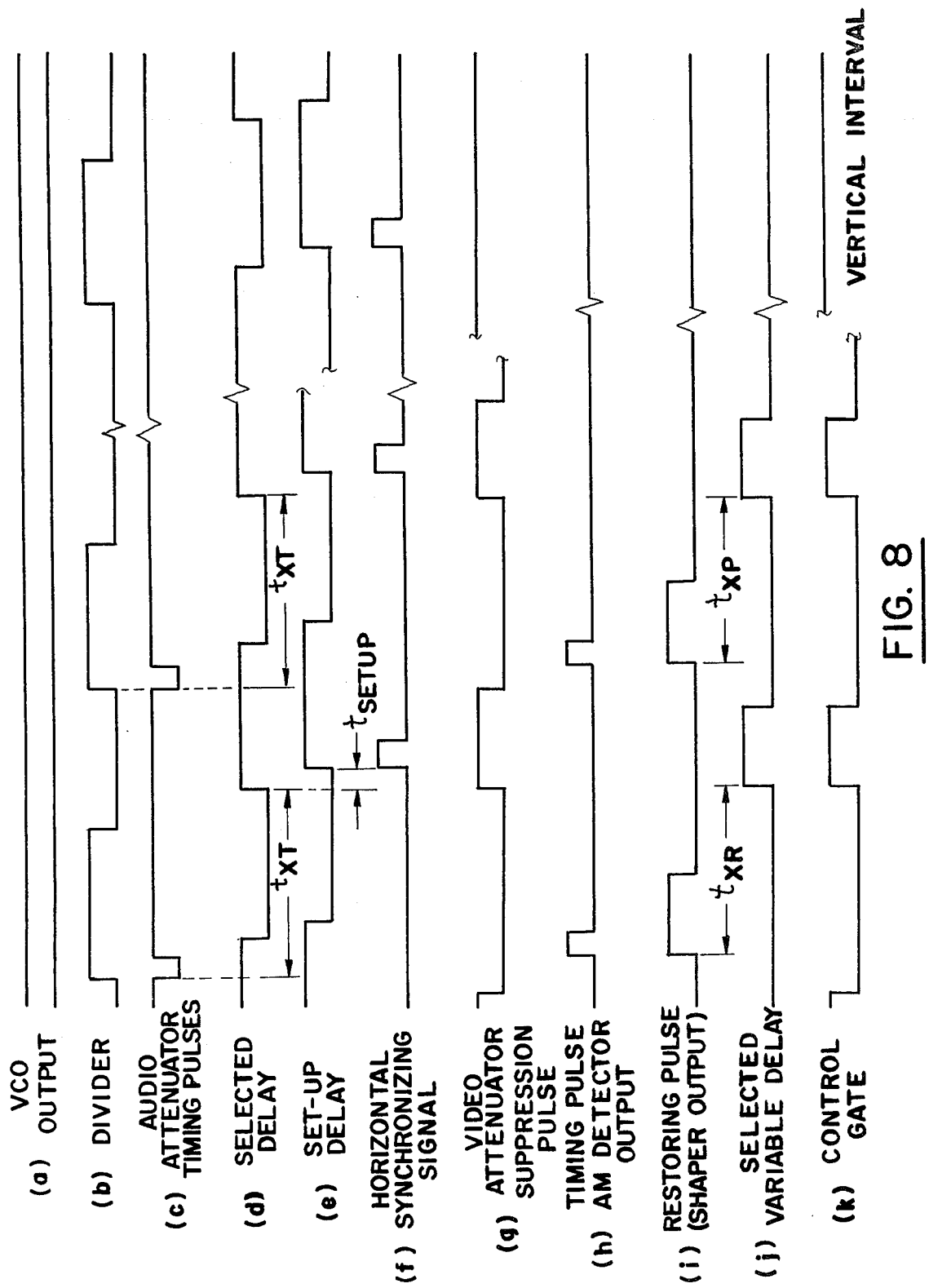
FIG. 8 is a series of wave forms illustrating the operation of the scrambling and descrambling system shown in FIGS. 4 and 7.

Another delay circuit 56 imposes the predetermined delay which is indicated as the set-up delay, $t_{setup}$, in the showing of such pulses in wave form (e) of FIG. 8. This delay circuit 56 is also desirably a digital delay circuit, a preferred form of which is illustrated in FIG. 6. The output pulses from the divider 44 (wave form (b) of FIG. 8) are effectively delayed to be within the locking range of the phase detector 58 of the phase locked loop 40. The phase detector then outputs a control voltage through a low pass filter 60 which changes the phase of the voltage controlled oscillator 42 output. The divider 44 output then moves in phase so that the leading edge of the output of the delay circuit 56 lines up with the horizontal sync pulse leading edge. Accordingly, the output of the variable delay circuit 50 which imposes the selected delay $t_{XT}$, and the set-up delay move in time, but maintain the selected delay, whereby timing of the restoring pulses in the descrambler from the timing pulses always produces the restoring pulses in overlapping relationship with the horizontal sync pulses so that they can be restored in the descrambler circuit.

Scrambling during the vertical sync interval is obtained by a pulse generator or timer circuit 62, which detects the vertical sync pulses and outputs a suppression pulse during the vertical sync interval. A suitable timer circuit for use in the pulse generator system 62 may respond to the vertical sync pulses and include delay circuits for generating pulses during the entire vertical retrace intervals. These vertical suppression pulses are applied to the gate 48, which operates as a NAND gate, so as to delete the timing pulses during the vertical sync interval. The gate 54 which passes the suppression pulses acts as an OR gate so that the vertical sync interval pulses are transmitted as suppression pulses during the vertical sync interval. Accordingly, the scrambled TV signal, encoded by the timing pulses, is generated and transmitted with the delay control signal, if variable selected delay is used, to the receiving station as a composite signal via the head end modular 24 of the cable system.

Referring to FIG. 5, the variable delay 50 may be a digital delay circuit having a clock oscillator 64 which produces a high frequency clock pulse train. A repetition rate of approximately 3.5 MHz may be suitable. These pulses are counted by a counter 66 which counts up to a four bit binary count of 16. The output of this counter has a repetition rate of approximately 224 KHz and is used as a clock for a variable bit length shift register 68. A length control switch 70 is provided to set the length of the variable length shift register 68 from zero to eleven bits, which in turn delays the pulses from the divider from zero to approximately 49 microseconds in eleven steps of approximately 4.5 microseconds each. The shift register output pulses may be applied to logic circuits containing one shots or other digital timers to provide more exact timing in the event that $t_{XT}$ is not precisely one of the twelve variable shift register delays.

The predetermined delay may be precisely set by means of the circuit shown in FIG. 6. There are two variable bit length shift registers 76 and 84 in tandem to delay the pulses from the variable delay circuit 50 to provide the output pulses from the delay circuit 56 to the phase detector 58 (See FIG. 4). The bit length of the variable length shift register 76 is set by a digital switch 78, the bit length of the variable length shift register 84 is set by another digital switch 86. The first variable length shift register 76 is clocked from a one MHz clock which is derived from a divide by eight divider 74 which is clocked by an eight MHz clock oscillator 72. The eight MHz clock oscillator also clocks a variable bit length shift register 80 which is set by a digital switch 82 to delay the one MHz clock in increments of 0.125 microsecond. The output to the phase detector 58 is delayed in one microsecond increments by the variable length shift register 76 and by the variable length shift register 84 and is delayed in 0.125 microsecond increments by phasing the variable length shift 84 clock by means of the variable length shift register 80. By phasing the clock pulses and selecting the variable delays in the chain, very precise digital delays of predetermined duration are obtained to provide alignment and location of the pulses in the phase lock loop 40.

Referring next to FIG. 7, the descrambler is there shown in greater detail in accordance with presently preferred embodiment of the invention. The set-top converter 26 is separately indicated, but may include a circuit board containing the descrambler circuits. When the descrambler circuits are not in operation, the set-top converter output may be switched directly to the RF (antenna) input to the TV set. Such switching may be omitted, if desired, in that the variable RF attenuator 92 normally inserts a fixed amount of attenuation which is decreased by the restoring pulses. This fixed amount of attenuation may be made up in the amplifiers of the TV set. The set-top converter may include circuits such as traps and filters for extracting the FM audio signal. This signal is then applied to an AM detector circuit 94 which may be a voltage doubler type diode detector. The timing pulses modulated on the FM carrier are detected as amplitude modulation. The AM detector may also include traps for the chroma component of the signal. The audio AM detector pulses are shown in wave form (h) of FIG. 8. These pulses are delayed slightly with respect to the timing pulses due to the delays in the detector circuit 94. This delay is accommodated by the predetermined or set-up delay in the scrambler so that the selected delays, $t_{XR}=t_{XT}$, are maintained.

The timing pulses may be fed to a pulse shaper 96 and then to a variable delay circuit 98. The variable delay circuit may precede the pulse shaper. The arrangement shown in FIG. 7 is, however, presently preferred since it lends itself better to the use of a shift register chain as a digital, variable delay circuit. The pulse shaper includes one shots or, preferably, a digital timer circuit for generating the restoring pulse of the desired duration less than the horizontal blanking interval. In the example shown in FIG. 8, where the horizontal interval is 13 microseconds, the restoring pulse may be 11 microseconds in duration starting after and ending before the horizontal interval and covering only the portion thereof which contains the horizontal sync signals. The variable delay circuit 98 and its delay control 100 may be similar to the corresponding circuits 50 and 16 shown in FIG. 4. They may be implemented by a digital delay circuit and digital control switch 70 as shown in FIG. 5. Preferably a chain of shift registers including variable bit length register, such as the 64 bit shift register 108 together with the 1-bit shift register 110 which is connected thereto, as will be described more fully hereinafter in connection with FIG. 9 may be used. The output of the variable delay circuit 98 is the restoring pulses shown in wave form (j) of FIG. 8.

A control gate and timer circuit 102 is operated by an authorization control which may be a digital switch or signal generator 104. When vertical scrambling pulses are used, the timer and the control gate 102 detects the absence of the timing pulses as they arrive from the variable delay circuit 98 and generates the vertical restoring pulse. The authorization signal enables the gate to pass the restoring pulses, which have been generated with the selected delay, $t_{XR}$. The control gate and timer therefore passes the restoring pulses, as indicated in wave form (k) in FIG. 8 to the RF attenuator 92 to restore the TV signal to normal amplitude. The delay control signal detector 106 design depends upon the location of the delay control signal in the TV signal. In cases where vertical interval scrambling is not used, the delay control signal may be transmitted during the vertical interval as a series of pulses modulated on the FM audio carrier. The delay control signal detector is then a digital decoder which translates the delay control signals into digital signals for operating switches in the delay control 100. In the event that the delay control signals are modulated on a carrier adjacent to the FM audio carrier, traps and filters for extracting that carrier are also contained in the delay control signal detector. Tones of different frequency or other analog coding may be used for the delay control signals. Digitally coded serial signals are preferred.

These signals are generated in a dynamic delay control and control signal generating circuit which is digitally operative and is shown in FIG. 9. The output of divider 44 (FIG. 4) which also goes to the timing pulse shaper 46 is applied to a chain 107 of shift registers, the 64-bit variable bit length shift register 108 in that chain 107 and the 1-bit shift register 110 also in the chain 107 provide the dynamically variable delay (the function of the variable delay circuit 50 of FIG. 4). The register 108 is preset by 6 bits of a 7 bit digital signal obtained from data stored in a programmable read only memory (PROM) 112. The other of the 7 bits presets the 1-bit shift register 110. Digital codes corresponding to, for example, 12 different delays in 4.5 microsecond increments with a ½ microsecond resolution are stored in the PROM and are available at the 7-bit output and also at a 4-bit output thereof. The 4-bit output presets another shift register 114 which outputs the delay control signal.

A 4-bit code from the delay control addresses the PROM 112. The delay control may be a programmer 116, such as a counter which successively provides different ones of the 4 codes. These codes may be changed in sequence, in predetermined order, or in random or pseudorandom order as may be desired. The clock rate of the counter in the programmer 116 should be slower than the horizontal sync rate so that the code does not change any faster than the horizontal sync pulses occur. Sufficient security may be provided by a much slower change in the code, for example, each frame time or even after long periods of time such as minutes or even hours. The shift registers 108 and 110 have data therein corresponding to the divider pulse train. This data may be provided with a fixed predetermined delay by an input 64-bit variable bit length shift register 118 which is preset to desired bit length by a 6-bit code from a digital switch 120. Additional predetermined delay may be provided by an 8-bit variable length shift register 122 which is preset by another digital switch 124. The output of the chain may be from a 1-bit shift register 124 which is preset in the 0 state to provide a 1-bit (1 clock pulse delay). The 1-bit shift register 124 may be considered to be part of the predetermined or set-up delay.

The clock pulses for shifting data corresponding to the divider pulses through the chain 107 are obtained from a clock oscillator 126 which provides 0.125 microsecond pulse period clock pulses. These clock pulses clock only the 8-bit variable bit length shift register 122 which affords a variable delay of up to one microsecond in ⅛ microsecond steps. A divide by 4 divider 128 provides ½ microsecond clock pulses to the 1-bit shift register 110. A divide by 2 divider 130 provides 1 microsecond clock pulses to the 64-bit variable length shift registers 108 and 118. The register 118 can provide up to 64 microseconds of predetermined delay. The variable delay provided by the 64-bit register 108 and the 1-bit register 110 is the 12 selected delays which may be separated by ½ microsecond increments. The suppression pulses are generated from the output of the 8-bit variable bit length shift register 122. This is the delay $t_{XT}$ shown in wave form (d) of FIG. 8. The last shift register in the chain 124 begins the delay which occurs between the start of the timing pulse and the leading edge of the horizontal sync pulse. The 1-bit shift register 124 and other delay circuits 56 provide the set-up or predetermined delay and produce the output shown in wave form (e) of FIG. 8.

The control signal output from the PROM 112 (4 bits) is used to preset the last 4 bits ($Q_4$ to $Q_8$) of the shift register 114. A digital switch 132 presets the initial 4 bits ($Q_0$ to $Q_3$) of the register 114 with an enabling code. At the same time as the PROM outputs the 4 signal delay signal code to the shift register 14, the programmer 116 applies a preset enable pulse to the shift register 114 so as to preset the register with the enabling code and the 4-bit control signal code. The data in the shift register 114 is shifted out using a clock at a special delay control signal rate. This may be a divided down (to about 3.5 MHz) from the system clock pulse train (from the clock 126). Alternatively, a separate crystal clock which is stable in frequency may be used. As the clock shifts the data out of the register, the parallel multi-bit delay signal code is converted to a serial code. This serial digital control signal is applied to the head end modulator where it may be used to modulate the audio IF or a separate carrier as discussed above. All of the circuits shown in FIG. 9 such as digital circuits which may be implemented in integrated circuit form.

Referring to FIG. 10, there is shown a circuit which may be used in the delay control 100 of a descrambler of a system having the circuitry of FIG. 9 in the scrambler at the head end of the cable. Each receiving station which is authorized for premium programming will use a delay control such as shown in FIG. 10. The demodulated delay control signal from the detector 106 (FIG. 7) is shifted into an 8-bit shift register 134. The first four output stages thereof provide a 4-bit parallel signal to a comparator 136. A digital switch 138 applies the enable code (the same code determined by the digital switch 132 FIG. 9) to the comparator 136 for comparison with the 4-bit codes of the DCS signal. If the codes match, a pulse is generated by a one-shot 140, which enables a 4-bit latch circuit 142 to store the latter 4 bits in the shift register 134. The control signal code is then converted back into a 4-bit parallel digital signal. The shift register 134 is clocked at the DCS rate by clock pulses derived from a crystal clock 144 divided down to the DCS rate by a divider 146. The slower clock clocks the DCS code into a decoder which translates it into a 7-bit parallel digital signal. These 7 bits may be applied to a 64-bit and one-bit shift register similar to the registers 108 and 110 shown in FIG. 9, which provides the variable delay circuit 98. A microprocessor 148 may be suitably programmed to operate the decoder.

The pulse shaper 96 and variable delay circuit 98 functions to obtain selected ones of the twelve delays may be implemented as shown in FIG. 11. Detected pulses from the A M detector 94 (See FIG. 4.) trigger a pulse generator 150 which is clocked from a 3.58 MHz clock oscillator 152. The 280 nanosecond pulse from the pulse generator 150 resets the flip flop 154 and resets the counter 156 through OR gate 158. The delay control 00 (See FIG. 4) controls a count selector 160 which counts from zero to 176 clock pulses (approximately 49 microseconds) in eleven 16 pulse groups (approximately 4.5 microseconds each). After the selected clock pulses are counted, flip flop 154 is set. The setting of the flip flop 154 causes the generation of an approximately 100 nanosecond pulse from the pulse generator 162. The pulse from pulse generator 162 resets the counter 156 through OR gate 158 and sets flip flop 164. After the counter 156 has counted 36 clock pulses the pulse gate 166 resets the flip flop 164 which outputs the delayed shaped pulse to the control gate 102 (See. FIG. 7).

From the foregoing description it will be apparent that it has been provided improved systems and methods for scrambling and encoding and descrambling and decoding television signals which carry premium programming to subscribers. The herein described system provides increased security efficiency against unauthorized descrambling of such premium programming. Variations and modifications in the herein described methods and systems, within the scope of the invention, will undoubtedly suggest themselves to those skilled in this art. Accordingly, the foregoing description should be taken as illustrative and not in a limiting sense.

I claim:

1. The method of sync suppression scrambling of TV signals having video signals with horizontal and vertical sync pulses and audio signals for subscription TV programs which comprises the steps of generating sync suppression pulses in overlapping time relationship with at least the horizontal sync pulses, generating timing pulses in selected time relationship with said sync suppression pulses such that each of said timing pulses and each of said suppression pulses have a selected delay with respect to each other, said selected time relationship being less than the duration between successive horizontal sync pulses selected from a plurality of different delays and a dynamically variable delay, suppressing in amplitude said horizontal sync pulses with said suppression pulses to scramble said TV signals, modulating said audio signals with said timing pulses to encode said TV signals, transmitting said scrambled and encoded TV signals from a transmitting station to receiving stations, deriving said timing pulses at said receiving stations, delaying said derived timing pulses with said selected delay to provide delayed timing pulses, generating restoring pulses in overlapping time relationship with said horizontal sync pulses upon occurrence of said delayed timing pulses, and restoring said horizontal sync pulses in amplitude with said restoring pulses to descramble said TV signals at those of said receiving stations which are authorized to receive subscription TV.

2. The method according to claim 1 including the step of generating second suppression pulses during the intervals in which said vertical sync pulses occur, suppressing in amplitude said vertical sync pulses with said second suppression pulses, inhibiting the occurrence of said timing pulses so that said delayed timing pulses become absent during the intervals of said video signal containing said vertical sync pulses, generating at said receiving stations second restoring pulses when said delayed timing pulses are absent, and restoring said vertical sync pulses in amplitude with said second restoring pulses at those of said receiving stations which are authorized to receive subscription TV.

3. The method according to claim 1 further comprising the step of varying said selected delay during said subscription TV program, generating delay control signals representing the variation in said selected delay for transmission with said TV signals, and varying the delaying of said timing signals in accordance with said delay control signals to provide said delayed timing signals at said receiving stations.

4. The method according to claim 1 wherein said step of generating said timing pulses in said selected time relationship comprises the step of selecting said selected delay from any of a plurality of predetermined delays of different duration, and said step of delaying said timing pulses to provide said delayed timing pulses comprises delaying said derived timing pulses intervals equal to one of said plurality of predetermined delays which is selected in said selecting step.

5. The method according to claim 4 wherein said selecting step and said delaying step each includes the step of digitally developing said plurality of delays in binarily related time increments, and generating said timing pulses and delayed timing pulses with said digitally developed delays.

6. The method of scrambling and encoding TV signals containing video signals with horizontal and vertical sync signals in horizontal and vertical intervals in each line and frame respectively of the picture represented by said video signals, and also containing audio signals which comprises the steps of generating sync suppression pulses occurring in said horizontal intervals and attenuating said video signals with said pulses to remove the horizontal sync pulses from said video signals to scramble said TV signals, generating timing pulses each with a selected delay with respect to said suppression pulses, said selected delay being less than the duration between successive horizontal sync signals selected from a plurality of different delays and a dynamically variable delay, and modulating said audio signal with said timing pulses to encode said TV signal with information representing the scrambling thereof.

7. The method according to claim 6 wherein said suppression signal generating step is carried out by generating a signal repetitive at the rate of said horizontal sync signals and successively delaying said last named signal by first and second intervals, equal to said selected delay and to a predetermined delay respectively, and generating said suppression signal in response to the timing of said horizontal sync rate repetitive signal after said first interval, and wherein said timing signal generating step is carried out by generating said timing signal in response to the timing of said horizontal sync rate repetitive signal before said first interval.

8. The method according to claim 7 further comprising the step of generating said suppression pulses also during said vertical intervals.

9. The method according to claim 7 further comprising the step of inhibiting the generation of said timing pulses during said vertical intervals.

10. The method according to claim 7 wherein said successively delaying step is carried out by first digitally delaying said horizontal sync rate repetitive signal with said selected delay for said first interval and then digitally delaying said horizontal sync rate repetitive signal after said first interval delay with said predetermined delay for said second interval.

11. The method according to claim 10 wherein said step of generating said horizontal sync rate signals is carried out by phase locking thereof with said selected and predetermined delays to said horizontal sync signals.

12. The method according to any of claims 6 to 11 further comprising the step of varying said selected delay and generating a control signal representing the duration of said selected delay to further encode said TV signal.

13. The method according to claim 11 further comprising generating a digital control signal, digitally varying said selected delay in response to said digital control signal in incremental intervals corresponding to the numerical values of said digital control signal, and transmitting said digital control signal with said TV signal to further encode said TV signal.

14. The method of decoding and descrambling TV signals which have been scrambled by suppression of said TV signals during intervals overlapping the horizontal sync signals thereof and encoded with timing signals on the aural carrier thereof having a selected delay with respect to said horizontal sync signals, said selected delay being less than the duration between successive horizontal sync signals selected from a plurality of different delays and a dynamically variable delay, which comprises the steps of detecting said timing signals, generating restoring pulses each have said selected delay with respect to said timing signals, and restoring said TV signals to normal amplitude during intervals including said horizontal sync signals with said restoring pulses.

15. The method according to claim 14 wherein said timing signals are pulses which amplitude modulate the FM carrier of the audio signals of said TV signal, and said detecting step comprises deriving said timing pulse from said FM carrier by detecting the amplitude modulation thereof.

16. The method according to claim 15 wherein said restoring pulse generating step comprises the step of generating pulses having a duration greater than said horizontal sync pulses and equal or less than said horizontal sync intervals in response to said timing pulses, and delaying with said selected delay said timing pulses or said pulses which are of duration greater than said horizontal sync pulses to provide said pulses which are of duration greater than said horizontal sync pulse as said restoring pulses.

17. The method according to claim 16 wherein said delaying step is carried out by digitally generating said selected delay which is applied to said timing pulses or said pulses of duration greater than said horizontal sync pulses.

18. The method according to claim 14 wherein said TV signal is further encoded by the absence of said timing signals during another interval including the vertical sync pulses of said TV signal, and wherein said restoring step comprises the steps of attenuating the amplitude of said TV signal except in the presence of said restoring pulses and in the absence of timing signals during the interval including said vertical sync pulses.

19. The method according to claim 14 wherein said selected delay of said timing signals is variable, and delay control signals representing the duration of said variable delay further encode said TV signal, and further comprising detecting said delay control signals and varying said selected delay of said restoring pulses with respect to said timing signals to correspond to the duration represented by said delay control signals.

20. The method according to claim 19 wherein said delay control signals represent incremental durations of delay and are digital signals, and said selected delay varying step is carried out by developing digital delays in response to said digital delay control signals and delaying said restoring pulses with respect to said timing signals in incremental intervals represented by said digital delay control signals.

21. A sync suppression scrambler subscription TV system which comprises means for generating at a transmission point, repetitively, a timing signal and a sync suppression signal which have a selected time delay relationship, said selected time relationship being less than the duration between successive horizontal sync pulses selected from a plurality of different delays and a dynamically variable delay, means for locating both said signals in time with respect to successive intervals of said TV signal each having a horizontal sync pulse thereof such that said suppression signal and horizontal sync intervals are coincident, means for suppressing said TV signal in amplitude during said interval with said suppression signal to suppress said horizontal sync signals, means for transmitting said TV signal with said horizontal sync signals suppressed and with said timing signal on the aural carrier of said TV signal to receiving stations, means for use at said receiving stations responsive to said timing signals for generating restoring signals which have said selected time delay relationship with said timing signals such that said restoring signals are coincident with at least a portion of said horizontal sync intervals which contain said horizontal sync signals, and means responsive to said restoring signals for increasing the amplitude of said TV signals in said portion of said horizontal sync interval to restore the amplitude of said horizontal sync signals so that, at those of said receiving stations which are authorized, subscription TV programs can be displayed.

22. The system according to claim 21 wherein said timing and said sync suppression signal generating means comprises means for generating first pulses repetitive at the rate of said horizontal sync signals, circuit means operated by said first pulses for generating timing pulses as said timing signals, first delay circuit means also operated by said first pulses for providing second pulses having said selected time delay relationship, and said locating means comprises means including second delay circuit means operated by said second pulses for shifting said first pulses in time.

23. The system according to claim 22 wherein said timing and sync suppression signal generating means further comprises a controllable oscillator, and said means including said second delay circuit means comprises a phase locked loop containing said oscillator, said first and second delay circuit means and a phase detector for comparing pulses from said second delay circuit means and said horizontal sync pulse in phase, said phase detector being connected to control said oscillator.

24. The system according to claim 23 further comprising pulse generator means operated by said second pulses for generating as said suppression signals, suppression pulses with durations equal to said horizontal sync intervals.

25. The system according to claim 24 wherein said first delay circuit means comprises control means for selecting said selected time delay from a plurality of delays of different durations.

26. The system according to claim 25 wherein said first delay circuit means comprises a clock pulse source, digital circuit means operated by said first pulses and clock pulses from said source for producing said selected time delay of said first pulses in a plurality of durations each being the durations of different numbers of clock pulse periods to provide said different delay durations, and said control means including means for conditioning said digital circuit means to produce selected ones of said different delay durations.

27. The system according to claim 26 wherein said digital circuit means comprises variable bit length shift register means for storing digital data corresponding to said first pulses, means responsive to said clock pulses for shifting said digital data therethrough to provide at the output thereof said first pulses with a delay corresponding to the bit length of said shift register means and the period of said clock pulses, and said control means comprises means for presetting the bit length of said variable bit length shift register means to provide selected ones of said different delay durations.

28. The system according to claim 27 further comprising means for programming said delay control means to change the presetting of said digital circuit means whereby to vary said selected time delay among said different delay durations, means for transmitting a delay control signal corresponding to the selected delay duration to said receiving stations, and means for varying the time relationship between said timing and restoring signals in accordance with said delay control signal.

29. The system according to claim 28 wherein said variable bit length shift register means comprises a plurality of shift registers at least one of which has a larger maximum bit length than another, means for dividing the rate of said clock pulses to provide said clock pulses with longer and shorter pulses periods, and means for applying said clock pulses of longer pulse periods to said shift register of larger maximum bit length and said clock pulses of shorter pulse periods to said shift register of shorter maximum bit length.

30. The system according to claim 27 wherein said second delay circuit means comprises a chain of shift registers, at least one of the shift registers in said chain being a variable bit length shift register, means for applying data corresponding to said second pulses to the input of said chain, means for presetting the bit length of said variable bit length shift register to control the delay of said second pulses in said chain, means for applying first clock pulses to said variable bit length shift register for shifting said data corresponding to said second pulses therethrough, means for applying second clock pulses of repetition rate lower than said first clock pulses to another of the shift register in said chain in selected time relationship to said first clock pulses whereby the further control the delay of said second pulses in said chain which comprises a further variable bit length shift register through which said second clock pulses are applied to said another shift register in said chain, means for applying said first clock pulses to said further variable bit length shift register for shifting data corresponding to said second clock pulses therethrough, and means for presetting said further variable bit length shift register to control the delay of said second clock pulses.

31. The system according to claim 22 wherein said video signals are accompanied by FM audio signals, means for separating said FM audio signals and video signals in separate channels, and wherein means are provided responsive to said second pulses for generating suppression pulses as said suppression signals with durations at least equal to said horizontal intervals, said suppressing means including separate variable attenuators in the FM audio signal channel and in the video signal channel, means for applying said timing pulses to said attenuator in said audio channel to amplitude modulate said FM audio signals therewith, means for applying said suppression pulses to said attenuator in said video signal channel to suppress said video channel signal during said horizontal sync intervals, said transmitting means including means for converting said amplitude modulated FM audio signals and said suppressed video signals into a composite signal for transmission to said receiving stations.

32. The system according to claim 31 further comprising means responsive to said video signal for generating pulses during each interval thereof which contains the vertical sync signals thereof, and means responsive to said pulses generated during said vertical sync interval for inhibiting the application of said timing pulses to said attenuator in said FM audio signal channel and for operating said attenuator in said video signal channel to suppress said video signal during said vertical sync interval.

33. The system according to claim 32 wherein said restoring signal generating means comprises means for demodulating the FM audio signals in said composite signal at said receiving stations to derive said timing pulses, means responsive to said timing pulses to provide said restoring pulses of duration greater than that of said horizontal sync signals and equal or less than said horizontal sync intervals, means for delaying said restoring pulses or said timing pulses with said selected time delay, means responsive to the absence of pulses at said horizontal sync rate for also providing restoring pulses during said vertical sync interval, and wherein said restoring means comprises a channel carrying at least the video signals of said composite signal, said channel including variable attenuator means responsive to said restoring pulses for increasing the level of said video signal during said horizontal and vertical intervals with respect to the level of said video signal during the remainder thereof.

34. The system according to claim 33 wherein said restoring means further comprises means for inhibiting the application of said restoring pulses to said variable attenuator means at those of said receiving stations at which reception of subscription TV programs is not authorized.

35. The system as set forth in claim 21 wherein said means for generating said timing and suppression signals comprises means for varying said time relationship to select different time relationships to increase the scrambling efficiency of said system, and said means for generating said restoring signals comprises means for varying the time relationship between said timing signals and said restoring signals at said receiving stations in synchronism with the variation in time relationship between said timing signals and said suppressing signals at said transmission point.

36. The system as set forth in claim 35 wherein said time relation varying means at said transmission point comprises means for generating a control signal representing said time relationship which changes continually, and said time relation varying means includes variable delay circuit means responsive to said control signal, means for transmitting said control signal with said TV signal to said receiving stations, said time relation varying means at said receiving stations also including variable delay circuit means responsive to said control signal.

37. The system according to claim 36 wherein said variable delay circuit means comprises programmable digital delay means having an input for said timing signals and an output for said delayed timing signal, said control signal generating means comprises programming means for generating successive, different multi-bit digital control signals, means for storing said digital control signals and applying data corresponding thereto in parallel to said programmable delay means, said control signal transmitting means comprises means for transmitting each bit of said multi-bit control signals serially to said receiving stations, means at said receiving stations for translating said serial multi-bit control signals into corresponding parallel multi-bit control signals, second programmable digital delay means having an input for said timing signal and an output for said delayed timing signal at said receiving stations, and means responsive to said parallel multi-bit control signals for operating said second programmable digital delay means.

38. The system according to claim 37 wherein said programmable digital delay means at said transmitting point and at said receiving stations each comprise a chain of shift registers at least one of which is a variable bit length shift register having preset inputs to which at least a plurality of bits of said multi-bit control signal are applied, said chains having data inputs and outputs for said timing signals and delayed timing signals, respectively, and clock pulse generating means for applying pulses to shift data corresponding to said timing signals through said chains.

39. The system according to claim 37 wherein said digital control signal transmitting means comprises a shift register having data input connected to said storing means for a plurality of first bits identifying said control signal and other data inputs for a plurality of second bits, means for generating said plurality of second bits and applying them to said other data inputs, and means for shifting said first and second plurality of bits serially out of said transmitting means shift register to provide said control signal for transmission to said receiving stations, said means at said receiving stations for translating said serial multi-bit control signals for operating said programmable delay means at said receiving stations comprising a shift register having an input for said serial multi-bit control signals, means for detecting the storage of said second plurality of bits of said multi-bit control signal in said receiving station shift register for deriving said first plurality of bits of said multi-bit shift register, and means for applying said derived first plurality of bits to program said programmable variable delay circuit at said receiving stations.

40. The system according to claim 35 wherein said means for varying the time relationship between said timing signals and said restoring signals comprises a first triggerable pulse generator, a clock oscillator, said first pulse generator being connected to said clock oscillator for producing a first pulse when triggered by each of said timing signals upon occurrence of a clock pulse from said clock oscillator, a counter for counting said clock pulses, a first flip flop, means for selecting said selected delay corresponding when a selected number of clock pulses are counted by said counter for setting said first flip flop in one of its states, said flip flop being connected to said first pulse generator for resetting said first flip flop to the other of its states, said counter being onnected to said first pulse generator for resetting said counter upon occurrence of said first pulse, a second pulse generator connected to said first flip flop and responsive to the setting thereof for producing a second pulse, said counter also being connected to said second pulse generator for also resetting said counter upon occurrence of said second pulse, a second flip flop connected to said second pulse generator for setting said second flip flop to one of its states, and means responsive to said counter when a predetermined number of clock pulses corresponding to the duration of said restoring signal are counted for resetting said second flip flop to produce said restoring signal at the output thereof.

* * * * *